United States Patent
Lee et al.

(10) Patent No.: US 12,537,221 B2
(45) Date of Patent: Jan. 27, 2026

(54) ELECTROLYTE FOR SECONDARY BATTERY AND SECONDARY BATTERY INCLUDING THE SAME

(71) Applicant: DAEGU GYEONGBUK INSTITUTE OF SCIENCE AND TECHNOLOGY, Daegu (KR)

(72) Inventors: Ho Chun Lee, Daegu (KR); Seok Bum Kang, Jeollabuk-do (KR); Chang Eui Yang, Busan (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 945 days.

(21) Appl. No.: 17/731,958

(22) Filed: Apr. 28, 2022

(65) Prior Publication Data

US 2022/0407116 A1 Dec. 22, 2022

(30) Foreign Application Priority Data

Jun. 17, 2021 (KR) .................. 10-2021-0078806

(51) Int. Cl.
*H01M 10/056* (2010.01)
*H01M 10/0567* (2010.01)
(Continued)

(52) U.S. Cl.
CPC ..... *H01M 10/056* (2013.01); *H01M 10/0567* (2013.01); *H01M 10/0568* (2013.01); *H01M 10/0569* (2013.01); *H01M 2300/0028* (2013.01)

(58) Field of Classification Search
CPC ..... H01M 10/0569; H01M 2300/0028; H01M 10/056; H01M 10/0565; H01M 2300/0065
See application file for complete search history.

(56) References Cited

U.S. PATENT DOCUMENTS

2007/0298326 A1\* 12/2007 Angell .................. H01M 6/164
  429/321
2016/0261000 A1\* 9/2016 Zhang ............... H01M 10/0568
(Continued)

FOREIGN PATENT DOCUMENTS

JP       2014-29840 A    2/2014
KR   10-2017-0134037 A   12/2017
(Continued)

OTHER PUBLICATIONS

Chemical Book, "Dimethyl sulfone", 2025 (Year: 2025).\*
(Continued)

*Primary Examiner* — Nicholas A Smith
*Assistant Examiner* — Ziheng Lu
(74) *Attorney, Agent, or Firm* — Hauptman Ham, LLP

(57) ABSTRACT

Provided is an electrolyte for a secondary battery including: a sulfone solvent represented by the following Chemical Formula 1; and a bis(fluorosulfonyl)imide alkali metal salt (MFSI):

$R_1R_2SO_2$     [Chemical Formula 1]

wherein $R_1$ and $R_2$ are independently of each other alkyl having 1 to 10 carbon atoms, alkoxy having 1 to 10 carbon atoms, aryl having 6 to 12 carbon atoms, or a combination thereof, and the alkyl, alkoxy, and aryl of $R_1$ and $R_2$ are independently of one another unsubstituted or substituted with halogen, amino, or nitro.

10 Claims, 5 Drawing Sheets

(51) Int. Cl.
　　　*H01M 10/0568*　　(2010.01)
　　　*H01M 10/0569*　　(2010.01)

(56) References Cited

U.S. PATENT DOCUMENTS

2017/0179524 A1*　6/2017　Chinnam ................ H01M 6/36
2018/0145370 A1*　5/2018　Buisine .................. H01G 11/56
2021/0066751 A1*　3/2021　Kim ...................... C08F 290/14

FOREIGN PATENT DOCUMENTS

KR　　10-2017-0139050 A　　12/2017
KR　　10-2020-0026056 A　　3/2020

OTHER PUBLICATIONS

Korean Notice of Allowance issued on Nov. 3, 2023, in connection with the Korean Patent Application No. 10-2021-0078806 with its English translation (9 pages).
Korean Office Action dated Jun. 15, 2023 for corresponding Korean Patent Application No. 10-2021-0078806, 4 pages.
"Sulfone-based Crystalline Organic Electrolytes for All-Solid-State Li and Na Batteries," The Korean Electrochemical Society, pp. 1-6.
Kang et al., "A Crystalline Organic Electrolyte for Safe, Room-Temperature Operable All-Solid-State Sodium Batteries," Energy Storage Materials, 2021, pp. 1-21, https://doi.org/10.1016/j.ensm.2021.04.031.
Tretyakov et al., "Formation of Contact Ion Pairs and Solvation of Li Ion in Sulfones: Phase Diagrams, Conductivity, Raman Spectra, and Dynamics," Journal of Chemical & Engineering Data, vol. 55, No. 5, 2010, pp. 1958-1964.
Gafurov et al., "Phase Equilibriums, Ion Association, and Mechanisms of Solvation in the LIN(CF3SO2)2-(CH3) 2SO2 System," Russian Journal of Physical Chemistry A, 2011, vol. 85, No. 9, pp. 1499-1504.
He et al., "Construction of conductive and flexible composite cathodes for room-temperature solid-state lithium batteries," Journal of Alloys and Compounds, 762 (2018), pp. 157-162.
Chinnam et al., "Bulk-Phase Ion Conduction in Cocrystalline LiCl—N,N-Dimethylformamide: A New Paradigm for Solid Electrolytes Based upon the Pearson Hard-Soft Acid-Base Concept," Chemistry of Materials, 2015, 27, 5479-5482.
Chinnam et al., "A Self-Binding, Melt-Castable, Crystalline Organic Electrolyte for Sodium Ion Conduction," Angew. Chem. Int. Ed., 2016, 55, 15254-15257.
Alarco et al., "The plastic-crystalline phase of succinonitrile as a universal matrix for solid-state ionic conductors," Nature Materials, vol. 3, Jul. 2004, pp. 476-481.
Zhu et al., "An All-solid-state and All-organic Sodium-ion Battery based on Redox-active Polymers and Plastic Crystal Electrolyte," Electrochimica Acta, 17 (2015), pp. 55-59.

* cited by examiner

ELECTROLYTE FOR SECONDARY BATTERY AND SECONDARY BATTERY INCLUDING THE SAME

CROSS-REFERENCE TO RELATED APPLICATIONS

This application claims priority under 35 U.S.C. § 119 to Korean Patent Application No. 10-2021-0078806, filed on Jun. 17, 2021, in the Korean Intellectual Property Office, the disclosure of which is incorporated herein by reference in its entirety.

TECHNICAL FIELD

The following disclosure relates to an electrolyte for a secondary battery; and a secondary battery including the same.

BACKGROUND

As an issue of global warming, which is problematic in modern society, arises, a demand for environmentally friendly technologies is rapidly increasing in response thereto. In particular, as a technical demand for electric vehicles and energy storage systems (ESS) increases, a demand for a lithium secondary battery, which is in the spotlight as an energy storage device, is exploding. Therefore, studies for safety improvement and higher performance of a lithium secondary battery are in progress.

In general, a conventional lithium secondary battery is a bulk-type battery formed of two electrodes formed of an active material in the form of powder and a liquid electrolyte, and is manufactured into an independent pack form. However, the conventional lithium secondary battery as described above is vulnerable to external shocks and has problems such as an explosion or leak.

Thus, a sulfide-based solid electrolyte, an oxide-based solid electrolyte, and a polymer-based solid electrolyte were suggested, but due to problems such as low ion conductivity, narrow electrochemical potential window, and low wettability with an electrode, there is a difficulty in commercialization.

In recent years, a succinonitrile (Sn)-based organic solid electrolyte has been suggested, but its melting point is 50° C. or lower, which is lower than an upper limit of common secondary battery operating temperature (60° C.), and an immobile film is formed on the surfaces of a positive electrode and a negative electrode to prevent smooth interfacial charge transfer.

Thus, development of a new electrolyte for solving the above problems is needed.

SUMMARY

An embodiment of the present invention is directed to providing an electrolyte for a secondary battery having significantly improved life characteristics and safety by securing safety at an upper limit of secondary battery operating temperature (60° C.)

In one general aspect,
an electrolyte for a secondary battery includes: a sulfone solvent represented by the following Chemical Formula 1; and
a bis(fluorosulfonyl)imide alkali metal salt (MFSI):

[Chemical Formula 1]

wherein $R_1$ and $R_2$ are independently of each other alkyl having 1 to 10 carbon atoms, alkoxy having 1 to 10 carbon atoms, aryl having 6 to 12 carbon atoms, or a combination thereof, and the alkyl, alkoxy, and aryl of $R_1$ and $R_2$ are independently of one another unsubstituted or substituted with halogen, amino, or nitro.

The sulfone solvent may be one or more selected from the group consisting of dimethyl sulfone, diethyl sulfone, ethyl methyl sulfone, dipropyl sulfone, dibutyl sulfone, dimethoxy sulfone, ethyl phenyl sulfone, diphenyl sulfone, methyl phenyl sulfone, benzyl sulfone, 4-fluorophenyl methyl sulfone, 4-aminophenyl sulfone, and nitrophenyl sulfone.

The alkali metal (M) may be sodium (Na) or lithium (Li).

The electrolyte may be a solid electrolyte.

The sulfone solvent may be one or more selected from the group consisting of dimethyl sulfone, diethyl sulfone, diphenyl sulfone, methyl phenyl sulfone, benzyl sulfone, 4-fluorophenyl methyl sulfone, 4-aminophenyl sulfone, and nitrophenyl sulfone.

The sulfone solvent may be dimethyl sulfone.

A mole ratio between the bis(fluorosulfonyl)imide alkali metal salt (MFSI) and the sulfone solvent may be 1:9 to 4:6.

The electrolyte may further include one or more additives selected from the group consisting of vinylene carbonate (VC), fluoroethylene carbonate (FEC), ethylene sulfite (ESA), lithium nitrate (LiNO$_3$), polyethylene oxide (PEO), polyvinylidene fluoride (PVDF), and polyacrylate.

The electrolyte may include 0.5 to 5 wt % of the additive.

The electrolyte may include a crystalline organic electrolyte having a cocrystal structure.

The electrolyte may include a sulfone-based crystalline organic electrolyte (SCOE).

The electrolyte may have a melting point of 50 to 170° C.

In another general aspect, a secondary battery includes: the electrolyte according to an exemplary embodiment; and an electrode.

The electrolyte for a secondary battery according to the present invention shows a high ion conductivity, and may express excellent performance and high safety even at an upper limit of secondary battery operating temperature (60° C.), and thus, may significantly improve the capacity and the life characteristics of a secondary battery including the same.

DETAILED DESCRIPTION OF EMBODIMENTS

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

The present invention provides an electrolyte for a secondary battery including: a sulfone solvent represented by the following Chemical Formula 1; and a bis(fluorosulfonyl)imide alkali metal salt (MFSI):

$R_1R_2SO_2$         [Chemical Formula 1]

wherein $R_1$ and $R_2$ are independently of each other alkyl having 1 to 10 carbon atoms, alkoxy having 1 to 10 carbon atoms, aryl having 6 to 12 carbon atoms, or a combination thereof, and the alkyl, alkoxy, and aryl of $R_1$ and $R_2$ are independently of one another unsubstituted or substituted with halogen, amino, or nitro.

The electrolyte for a secondary battery according to the present invention includes both the sulfone solvent and the bis(fluorosulfonyl)imide alkali metal salt (MFSI), thereby having excellent stability and, in particular, improved life characteristics even at a high temperature.

The electrolyte for a secondary battery according to an exemplary embodiment of the present invention may be a liquid electrolyte including the sulfone solvent and the bis(fluorosulfonyl)imide alkali metal salt (MFSI).

The sulfone solvent acts as a medium in which ions involved in the electrochemical reaction of a battery may move, and may be, for example, one or more selected from the group consisting of dimethyl sulfone, diethyl sulfone, ethyl methyl sulfone, dipropyl sulfone, dibutyl sulfone, dimethoxy sulfone, ethyl phenyl sulfone, diphenyl sulfone, methyl phenyl sulfone, benzyl sulfone, 4-fluorophenyl methyl sulfone, 4-aminophenyl sulfone, and nitrophenyl sulfone. The sulfone solvent may be used alone or in combination of two or more, and a mixing ratio when used in combination of two or more may be properly adjusted depending on the performance of a secondary battery to be desired. Meanwhile, any known organic solvent in the art may be further included, but the present invention is not limited thereto.

The bis(fluorosulfonyl)imide alkali metal salt (MFSI) is dissolved in the sulfone solvent described above and acts as a source of an alkali metal ion in a battery to allow basic operation of a secondary battery and promote movement of the alkali metal ions between a positive electrode and a negative electrode. An alkali metal (M) in the bis(fluorosulfonyl)imide alkali metal salt (MFSI) may be adjusted depending on the kind of secondary battery, and as a non-limiting example, the alkali metal (M) may be sodium (Na) in a sodium secondary battery and lithium (Li) in a lithium secondary battery.

A concentration of the bis(fluorosulfonyl)imide alkali metal salt (MFSI) may be 0.5 to 4.0 M, for example, 1.0 to 1.5 M based on a total volume of the liquid electrolyte. Since the liquid electrolyte has excellent ion conductivity and viscosity within the range, stable electrolyte performance may be shown at an upper limit of secondary battery operating temperature (60° C.) as well as at room temperature, and the alkali metal ions involved in charge and discharge of a secondary battery may move more effectively.

In addition, the liquid electrolyte may further include pyridine, triethyl phosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, aluminum trichloride, and the like, if necessary, for improving charge/discharge characteristics, flame retardant characteristics, and the like. In some cases, a halogen-containing solvent such as carbon tetrachloride and ethylene trifluoride may be further included for imparting non-flammability, and fluoroethylene carbonate (FEC), propene sulfone (PRS), fluoropropylene carbonate (FPC), and the like may be further included for improving conservation properties at a high temperature.

The electrolyte for a secondary battery according to an exemplary embodiment of the present invention may be a solid electrolyte including the sulfone solvent and the bis (fluorosulfonyl)imide alkali metal salt (MFSI).

The sulfone solvent and the bis(fluorosulfonyl)imide alkali metal salt (MFSI) in the solid electrolyte form a eutectic system, and the melting point of the solid electrolyte may be determined depending on the melting point of the solvent and the metal salt themselves and their mixing ratio.

In terms of adjusting the melting point of the solid electrolyte to be higher than an upper limit of common secondary battery operating temperature (60° C.), it is advantageous for the melting point of the sulfone solvent to be 50° C. or higher, preferably 60° C. or higher. Here, the upper limit of the melting point of the sulfone solvent may be 200° C. or lower, preferably 170° C. or lower, and thus, the melting point of the solid electrolyte may be adjusted to be lower than the melting point of a polymer binder (170° C.) included in the electrode, so that a melt casting process described later may be applied.

The sulfone solvent according to an exemplary embodiment of the present invention is represented by Chemical Formula 1, and in Chemical Formula 1, at least one of $R_1$ and $R_2$ is phenyl or benzyl and the phenyl is unsubstituted or substituted with halogen, amino, or nitro. Specifically, the sulfone solvent may be one or more selected from the group consisting of diphenyl sulfone, methyl phenyl sulfone, benzyl sulfone, 4-fluorophenyl methyl sulfone, 4-aminophenyl sulfone, and nitrophenyl sulfone.

The sulfone solvent according to an exemplary embodiment of the present invention is represented by Chemical Formula 1, and in Chemical Formula 1, $R_1$ and $R_2$ may be independently of each other alkyl having 1 to 7 carbon atoms, preferably alkyl having 1 to 3 carbon atoms, and in terms of satisfying the melting point of the sulfone solvent, $R_1$ and $R_2$ may be identical to each other. In this case, due to the symmetric structure of a solvent compound molecule, a solid electrolyte having a melting point range to be desired in the present invention as compared with a solvent compound molecule having an unsymmetric structure may be easily implemented. Specifically, the sulfone solvent may include one or more selected from the group consisting of dimethyl sulfone and diethyl sulfone, and most preferably, may include dimethyl sulfone. Dimethyl sulfone is advantageous since it has a permittivity and excellent electrochemical stability and is inexpensive and harmless to the human body.

Meanwhile, in the conventional technology, for the solvent used in a solid electrolyte, the melting point of a solvent is not particularly recognized, and thus, since the melting point of the prepared solid electrolyte is lower than an upper limit of common secondary battery operating temperature (60° C.), the stability of the solid electrolyte is deteriorated during a secondary battery operation process, thereby significantly decreasing life characteristics. However, since the solid electrolyte according to an exemplary embodiment of the present invention satisfies the conditions described above, it may have a melting point of 50 to 170° C., preferably 60 to 170° C.

In terms of adjusting the melting point of the solid electrolyte to a common secondary battery operating temperature or higher and a melting point of a polymer binder included in the electrode or lower, a mole ratio between the bis(fluorosulfonyl)imide alkali metal salt (MFSI) and the sulfone solvent may be 1:9 to 4:6, preferably 1:9 to 3:7. When the mole ratio between MFSI and the sulfone solvent is out of the above range, the melting point of the solid electrolyte including them is too high, and the ion conductivity is decreased.

Specifically, the mole ratio between MFSI and the sulfone solvent may be different depending on the charge density of the alkali metal (M) ion, and for example, when the alkali metal (M) is lithium (Li) having a high charge density, the mole ratio may be 2:8 to 3:7, and when the alkali metal salt (M) is sodium (Na), the mole ratio may be 1:9 to 3:7. Meanwhile, the charge density of the alkali metal (M) ion is proportional to an atomic radius, and the smaller the atomic radius is, the higher the charge density is.

Since the solid electrolyte according to an exemplary embodiment of the present invention satisfies the conditions described above, it may have a melting point of 50 to 170° C., preferably 60 to 170° C. Accordingly, since the solid electrolyte may be maintained in a solid state at room temperature and may be maintained in an initial state even during an operation process of a secondary battery including the solid electrolyte, the performance of a solid electrolyte may be efficiently expressed, so that the life characteristics and the safety of the secondary battery may be significantly improved. However, since the melting point of a conventional solid electrolyte is lower than the upper limit of a common secondary battery operating temperature (60° C.), the stability of the solid electrolyte during the operation process of a secondary battery is deteriorated to significantly decrease the life characteristics.

In the solid electrolyte, the sulfone solvent and the bis (fluorosulfonyl)imide alkali metal salt (MFSI) may form a cocrystal structure due to their molecular similarity. Accordingly, the solid electrolyte may include a crystalline organic electrolyte (COE) having a cocrystal structure, and specifically, may include a sulfone-based crystalline organic electrolyte (SCOE), and thus, it may have high oxidation stability and may show a high ion conductivity of an alkali metal ion, for example, $Na^+$ and/or $Li^+$ even at room temperature.

Furthermore, the solid electrolyte may significantly decrease interfacial resistance with an electrode by a melt casting process. Specifically, the solid electrolyte in a molten state is injected into an electrode having a porous structure and then cooled to room temperature to solidify the electrolyte into an initial state, thereby significantly decreasing the interfacial resistance between the electrolyte and the electrode. Meanwhile, when the melting point of the solid electrolyte is higher than 170° C., it is higher than the melting point of the polymer binder in the electrode, so that the melt casting process described above may not be used.

When a crystalline organic electrolyte which is not based on sulfone, for example, $NaClO_4(DMF)_3$ or $NaClO_4(ADN)_3$ cocrystal structure is included, oxidation stability is excellent, but a low ion conductivity is shown at room temperature.

Meanwhile, the results of analyzing the interfacial properties with the electrode after applying the solid electrolyte including the crystalline organic electrolyte to the melt casting process described above, or the results of analyzing the electrochemical properties after practically applying the electrolyte to a secondary battery have not been reported to date.

Figure 1:
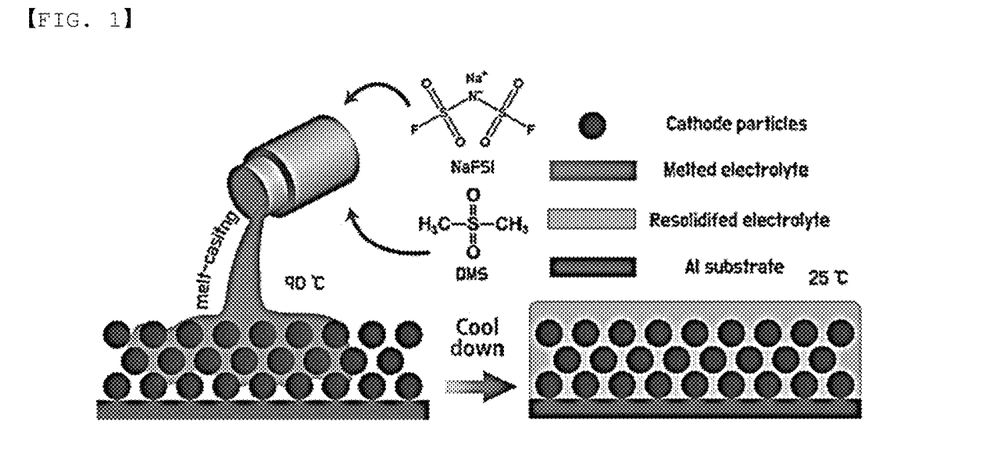
FIG. 1 is a drawing showing a melt casting process using the electrolyte according to an exemplary embodiment of the present invention.

FIG. 1 is a drawing showing the melt casting process using the electrolyte according to an exemplary embodiment of the present invention. Specifically, the casting may be performed by melting a sulfone-based crystalline organic electrolyte including sodium bisfluorosulfonylimide (NaFSI) and dimethyl sulfone (DMS) at 90° C., injecting the molten electrolyte to a positive electrode active material laminated on a current collector, and then cooling the electrolyte to room temperature again. Accordingly, the interfacial resistance between the electrolyte and the electrode may be significantly decreased.

The solid electrolyte may further include an additive, any additive may be used without limitation as long as it is commonly used in the art, and the additive may include any one or more selected from the group consisting of vinylene carbonate (VC), fluoroethylene carbonate (FEC), ethylene sulfide (ESA), lithium nitrate ($LiNO_3$), polyethylene oxide (PEO), polyvinylidene fluoride (PVDF), and polyacrylate.

In terms of efficiently expressing the effect of decreasing the interfacial resistance between the electrolyte and the electrode, the electrolyte may include 0.5 to 5 wt %, preferably 1 to 2 wt % of the additive.

The present invention also provides a secondary battery including the electrolyte according to an exemplary embodiment of the present invention; and an electrode.

The electrode includes a positive electrode and a negative electrode.

The positive electrode may include a current collector, and a positive electrode active material layer formed by applying a positive electrode slurry including a positive electrode active material on at least one surface of the current collector.

The current collector may be selected from the group consisting of copper foil, nickel foil, stainless steel foil, titanium foil, nickel foam, copper foam, a polymer substrate coated with a conductive metal, and a combination thereof, but is not limited thereto.

The positive electrode active material layer includes a positive electrode active material, and optionally, may further include a binder and a conductive material. The positive electrode active material may be any positive electrode active material known in the art, and may be, for example, a composite oxide of lithium with a metal selected from cobalt, manganese, nickel, vanadium, and a combination thereof, but is not limited thereto.

The positive electrode includes the binder, so that the positive electrode active material particles may be adhered well to each other and the positive electrode active material may be adhered well to the current collector. The binder is not particularly limited as long as it is used as a positive electrode binder in the art, and, for example, may be a non-aqueous binder, an aqueous binder, or a combination thereof.

The conductive material is used for imparting conductivity to an electrode, and any conductive material may be used as long as it is an electroconductive material without causing a chemical change in the battery to be configured. For example, the conductive material may include a carbon-based material such as natural graphite, artificial graphite, carbon black, acetylene black, ketjen black, and carbon fiber; a metal-based material such as metal powder or metal fiber of copper, nickel, aluminum, silver, and the like; a conductive polymer such as a polyphenylene derivative; or a mixture thereof.

The contents of the binder and the conductive material in the positive electrode active material layer may be 1 to 10 wt %, preferably 1 to 5 wt %, respectively, with respect to the total weight of the positive electrode active material layer, but are not limited thereto.

The negative electrode may include a current collector, and a negative electrode active material layer formed by applying a negative electrode slurry including a negative electrode active material on at least one surface of the current collector.

The current collector is as described above.

The negative electrode active material layer includes a negative electrode active material, and optionally, may further include a binder and a conductive material. An example of the negative electrode active material may be a carbon-based negative electrode active material, a silicon-based negative electrode active material, or a mixture thereof, but is not limited thereto. The carbon-based negative electrode active material may be one or more selected from artificial graphite, natural graphite, and hard carbon. The silicon-based negative electrode active material may be Si, $SiO_x$ (0<x<2), a Si-Q alloy (wherein Q is an element selected from the group consisting of alkali metals, alkali earth metals, Group 13 elements, Group 14 elements, Group 15 elements, Group 16 elements, transition metals, rare earth elements, and a combination thereof, but is not Si), a Si-carbon composite, or a mixture of at least one thereof with $SiO_2$.

The binder and the conductive material are as described above.

The negative electrode according to an exemplary embodiment of the present invention may include a lithium metal or a sodium metal.

The electrolyte is as described above.

The secondary battery according to an exemplary embodiment of the present invention may be an all-solid-state secondary battery. Since the all-solid-state secondary battery includes the solid electrolyte, high ion conductivity and stable electrochemical stability may be shown, and interfacial resistance between the solid electrolyte and the electrode may be significantly decreased. Meanwhile, since the solid electrolyte has a melting point of 60 to 170° C., a solid state is maintained even during an operation process of the all-solid-state secondary battery, so that deterioration due to a charge and discharge process is suppressed, and thus, excellent life characteristics may be shown.

Hereinafter, the preferred Examples and Comparative Examples of the present invention will be described. However, the following Examples are only a preferred exemplary embodiment of the present invention, and the present invention is not limited thereto.

EXAMPLES

Preparation of Sulfone Electrolyte for Lithium Battery

Example 1 wt % of PEO was added to a mixture of lithium bis(fluorosulfonyl)imide (LiFSI) and dimethyl sulfone (DMS) at a mole ratio of 2.5:7.5, and the mixture was heated to 90° C. to be co-melted and cooled to room temperature again, thereby synthesizing a sulfone compound-based solid electrolyte.

Example 2

The process was performed in the same manner as in Example 1, except that 1.5 wt % of PEO was added instead of 1 wt %.

Comparative Example 1

The process was performed in the same manner as in Example 1, except that lithium bis(trifluoromethanesulfonyl)imide (LiTFSI) was used instead of lithium bis(fluorosulfonyl)imide (LiFSI).

Comparative Example 2

A mixture of lithium bis(trifluoromethanesulfonyl)imide (LiTFSI) and dimethyl sulfone (DMS) at a mole ratio of 1.5:8.5 was heated to 90° C. to be co-melted, and cooled to room temperature again, thereby synthesizing a sulfone compound-based solid electrolyte.

Manufacturing Example 1

A lithium metal (thickness: 200 μm) was cut in a circle (diameter: 16.5 mm) and used as a negative electrode and a positive electrode.

The solid electrolytes prepared in Examples 1 and 2 and Comparative Examples 1 and 2 were melted at 90° C. and impregnated into pores of a Celgard3501 separator, and a coin cell battery with a stainless steel exterior was assembled.

Manufacturing Example 2

A lithium metal (thickness: 200 μm) was cut in a circle (diameter: 16.5 mm) and used as a negative electrode.

A solvent in which hydrochloric acid and water were mixed at a volume ratio of 1:9 was used to wash a copper foil, which was cut in a circle (diameter: 12 mm) and used as a positive electrode.

The solid electrolytes prepared in Example 1 and Comparative Example 1 were melted at 90° C. and impregnated into pores of a Celgard3501 separator, and a coin cell battery was assembled in the same manner as in Manufacture Example 1.

Manufacturing Example 3

A lithium metal (thickness: 200 μm) was cut in a circle (diameter: 16.5 mm) and used as a negative electrode. A $LiNi_{0.8}Co_{0.8}Mn_{0.1}O_2$ (NCM) positive electrode having a capacity per area of 3 mAh $cm^{-2}$ was cut in a circle (diameter: 12 mm) and used as a positive electrode.

The solid electrolytes prepared in Example 1 and Comparative Example 1 were melted at 90° C. and were impregnated in the $LiNi_{0.8}Co_{0.8}Mn_{0.1}O_2$ (NCM) positive electrode and the pores of a Celgard3501 separator, and a coin cell battery was assembled in the same manner as in Manufacturing Example 1, except that a bottom plate was made of aluminum.

Evaluation Method

Evaluation Example 1: Analysis of Melting Point of Solid Electrolyte and Lithium/Solid Electrolyte Interfacial Resistance Examples 1 and 2 and Comparative Examples 1 and 2

Melting points of the solid electrolytes prepared in Examples and 2 and Comparative Examples 1 and 2 and interfacial resistance of the lithium/solid electrolyte were measured, and the results were shown in following Table 1.

Specifically, the melting point of the solid electrolyte was measured using differential scanning calorimetry (DSC), and the lithium/solid electrolyte interfacial resistance was measured by electrochemical impedance spectroscopy (EIS) analysis (25° C.) of the battery manufactured in Manufacturing Example 1.

TABLE 1

|  | PEO additive (wt %) | Lithium/solid electrolyte interfacial resistance ($\Omega$ $cm^2$) | Melting point (° C.) |
|---|---|---|---|
| Example 1 | 1 | 26.4 | 65 |
| Example 2 | 1.5 | 34.8 | 65 |
| Comparative Example 1 | 1 | 50 | 58 |
| Comparative Example 2 | 0 | 120 | 70 |

As confirmed in Table 1, the solid electrolytes prepared according to Examples 1 and 2 had a high melting point of 65° C., but the solid electrolyte according to Comparative Example 1 showed a melting point of 58° C. Meanwhile, when a solid electrolyte having a melting point lower than 60° C. which is the operating temperature of a lithium secondary battery is applied to a lithium secondary battery and charge and discharge are performed, the solid electrolyte may melt during an operation process.

In addition, it was confirmed that the solid electrolytes according to Examples 1 and 2 showed lithium/solid electrolyte interfacial resistance lower than that of Comparative Examples 1 and 2. In particular, in the case of Comparative Example 2, it is considered that since no additive was included, resistance in the interface between lithium and the solid electrolyte was significantly increased.

Evaluation Example 2: Evaluation of Lithium/Copper Battery Life Characteristics

Figure 2:
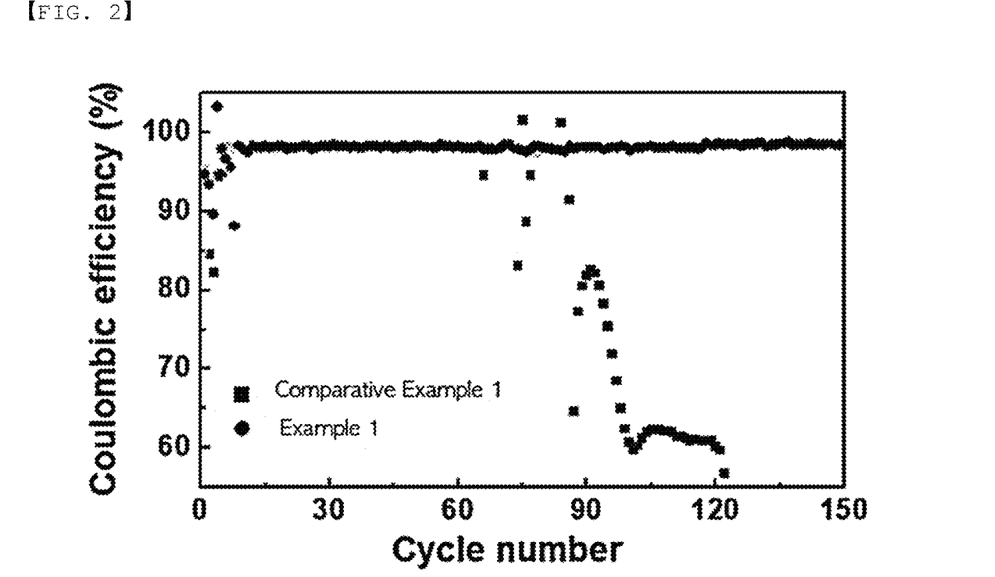
FIG. 2 is a drawing showing results of evaluating life characteristics of lithium/copper batteries to which the electrolytes prepared according to Example 1 and Comparative Example 1 of the present invention were applied.

The life characteristics of lithium/copper batteries to which the solid electrolytes prepared in Example 1 and Comparative Example 1 were applied were evaluated, and the results are shown in FIG. 2.

Specifically, the lithium/copper battery manufactured in Manufacturing Example 2 was charged and discharged once with a constant current of 0.1 C in 0-1 V region at 45° C., and then charged and discharged 150 times under the same temperature conditions.

As confirmed in FIG. 2, the lithium/copper battery including the solid electrolyte of Example 1 showed excellent life characteristics even under the operating conditions of 45° C., and a high coulombic efficiency of 98% or more was shown for 150 times. However, it was confirmed that the lithium/copper battery including the solid electrolyte of Comparative Example 1 had a sharply decreased coulombic efficiency after 80 times of charge and discharge under the same charge and discharge conditions.

Meanwhile, the temperature of the battery was raised during the charge and discharge process, and when the charge and discharge were performed 50 times or more under the operating conditions of 45° C., the internal temperature of the battery may reach up to 60° C. That is, it is recognized that since the solid electrolyte according to an exemplary embodiment of the present invention had a melting point of 60° C. or higher, it showed stable performance even at 60° C.

Evaluation Example 3: Evaluation of Life Characteristics of Lithium/NCM Battery

Figure 3:
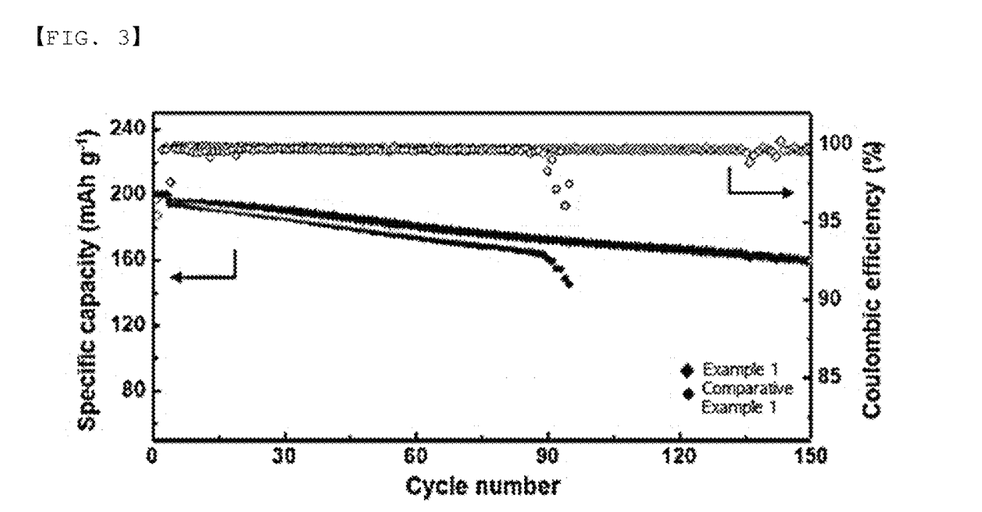
FIG. 3 is a drawing showing results of evaluating life characteristics of lithium/NCM batteries to which the electrolytes prepared according to Example 1 and Comparative Example 1 of the present invention were applied.

The life characteristics of lithium/NCM batteries to which the solid electrolytes prepared in Example 1 and Comparative Example 1 were applied were evaluated, and the results are shown in FIG. 3.

Specifically, the lithium/NCM battery manufactured in Manufacturing Example 3 was charged and discharged three times with a constant current of 0.1 C in 3-4.3 V region at 45° C., and then charged and discharged 150 times under the same temperature conditions.

As confirmed in FIG. 3, the lithium/NCM battery including the solid electrolyte of Example 1 showed excellent life characteristics even under the operating conditions of 45° C. Specifically, a discharge capacity of 160 mAh·$cm^{-2}$ or more and a high coulombic efficiency of 99.8% or more were shown even after 150 times of charge and discharge. Since the internal temperature of the lithium/NCM battery during 150 times of charge and discharge process substantially reached 60° C., it is recognized that the solid electrolyte according to the present invention showed excellent life characteristics even at 60° C.

However, since the solid electrolyte of Comparative Example 1 had a melting point of lower than 60° C., it was confirmed that the lithium/NCM battery including the electrolyte had sharply decreased coulombic efficiency and discharge capacity after 90 times of charge and discharge under the same charge and discharge conditions.

Preparation of Sulfone Electrolyte for Sodium Battery

Example 3

Sodium bisfluorosulfonylimide (NaFSI) and dimethyl sulfone (DMS) were mixed at a mole ratio of 1:9, heated to 90° C. to be co-melted, and cooled to room temperature again, thereby synthesizing a sulfone compound-based cocrystalline solid electrolyte.

Example 4

The process was performed in the same manner as in Example 3, except that a mole ratio of NaFSI:DMS was 1.5:8.5 instead of 1:9.

Example 5

The process was performed in the same manner as in Example 3, except that a mole ratio of NaFSI:DMS was 2:8 instead of 1:9.

Example 6

The process was performed in the same manner as in Example 3, except that a mole ratio of NaFSI:DMS was 3:7 instead of 1:9.

Example 7

The process was performed in the same manner as in Example 5, except that 0.5 wt % of fluoroethylene carbonate (FEC) was added based on the mixture.

Comparative Example 3

A non-aqueous electrolyte solution was prepared by adding 1.0 mol/L of $NaPF_6$ to a mixed solvent of ethylene carbonate (EC) and diethyl carbonate (DEC) at a volume ratio of 1:1.

Comparative Example 4

The process was performed in the same manner, except that 2 wt % of fluoroethylene carbonate (FEC) was added to the electrolyte solution prepared in Comparative Example 3.

Manufacturing Example 4

A sodium metal (thickness: 200 μm) was cut in a circle (diameter: 16 mm) and used as a negative electrode and a positive electrode.

The solid electrolytes prepared in Examples 5 and 7 were melted at 90° C. and impregnated in pores of a Whatman GF/A fiberglass separator, and a coin cell battery with an aluminum exterior was assembled.

Manufacturing Example 5

70 parts by weight of $Na_3V_2(PO_4)_3$ (hereinafter, referred to as NVP) powder coated with carbon in a nano-thickness on the surface was mixed with 15 parts by weight of a carbon conductive material (Super P, Alfa Asear), and the mixture was prepared into a paste phase. The paste was applied on an aluminum foil and dried, thereby manufacturing an NVP electrode plate for test.

A sodium metal (thickness: 200 μm) was cut into a circle (diameter: 16 mm) and used as a negative electrode, and the NVP electrode plate manufactured above was cut in a circle (diameter: 12 mm) and used as a positive electrode.

The solid electrolyte prepared in Example 7 was melted at 90° C. and impregnated in pores of a Whatman GF/A fiberglass separator, and a coin cell battery with an aluminum exterior was assembled.

Meanwhile, the electrolyte prepared in Comparative Example 4 was impregnated in pores of a Whatman GF/A fiberglass separator, and a coin cell battery with an aluminum exterior was assembled. The positive electrode and the negative electrode are as described above.

Evaluation Example 4: Analysis of Ion Conductivity Depending on Temperature of Solid Electrolyte Examples 3 to 7

Figure 4:
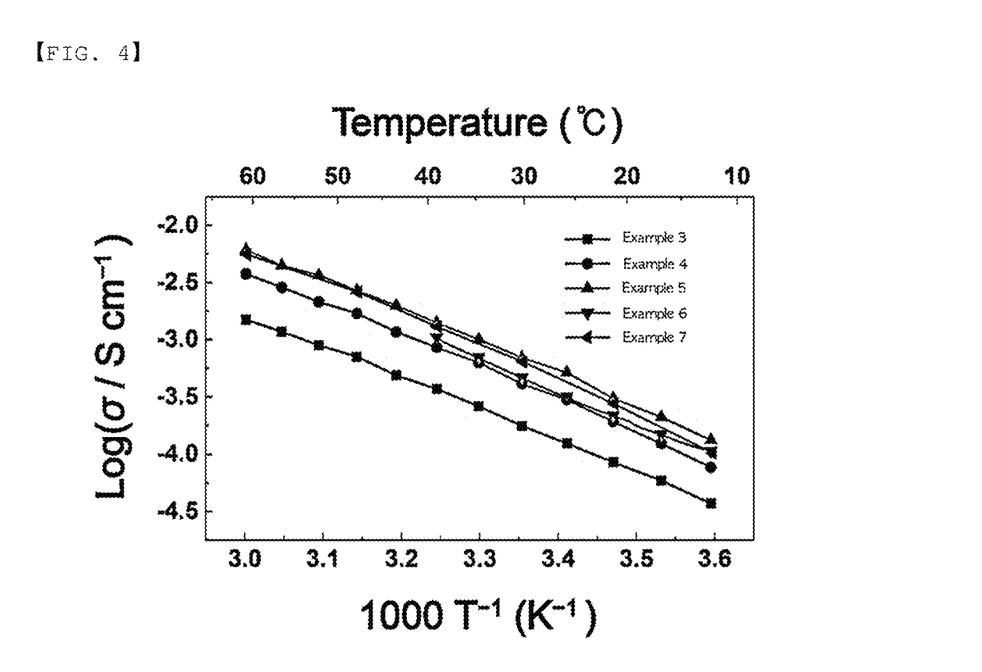
FIG. 4 is a drawing showing results of analyzing ion conductivity for the electrolytes prepared according to Examples 3 to 7 of the present invention.

The ion conductivity of the solid electrolytes prepared in Examples 3 to 7 was measured in a temperature range of 5 to 60° C., and the results are shown in FIG. 4.

Specifically, two stainless steel plates having the same size (width: 10 mm, length: 75 mm, thickness: 1 mm) were prepared and were bound to a fixed base printed with a 3D printer to manufacture an ion conductivity measurement device having a constant spacing of 3 mm, and the measurement device was used to measure the ion conductivity depending on the temperature of the solid electrolyte.

As confirmed in FIG. 4, the solid electrolytes prepared according to an exemplary embodiment of the present invention (Examples 5 to 7) showed excellent ion conductivity in a temperature range of 5 to 60° C. as compared with a common oxide-based solid electrolyte and a polymer-based solid electrolyte.

Meanwhile, in Examples 3 to 7, it was confirmed that Examples 5 and 7 satisfying the conditions of a mole ratio of NaFSI:DMA of 2:8 showed the best ion conductivity properties.

Evaluation Example 5: Analysis of Oxidation Stability

Example 5 and Comparative Example 3

Figure 5:
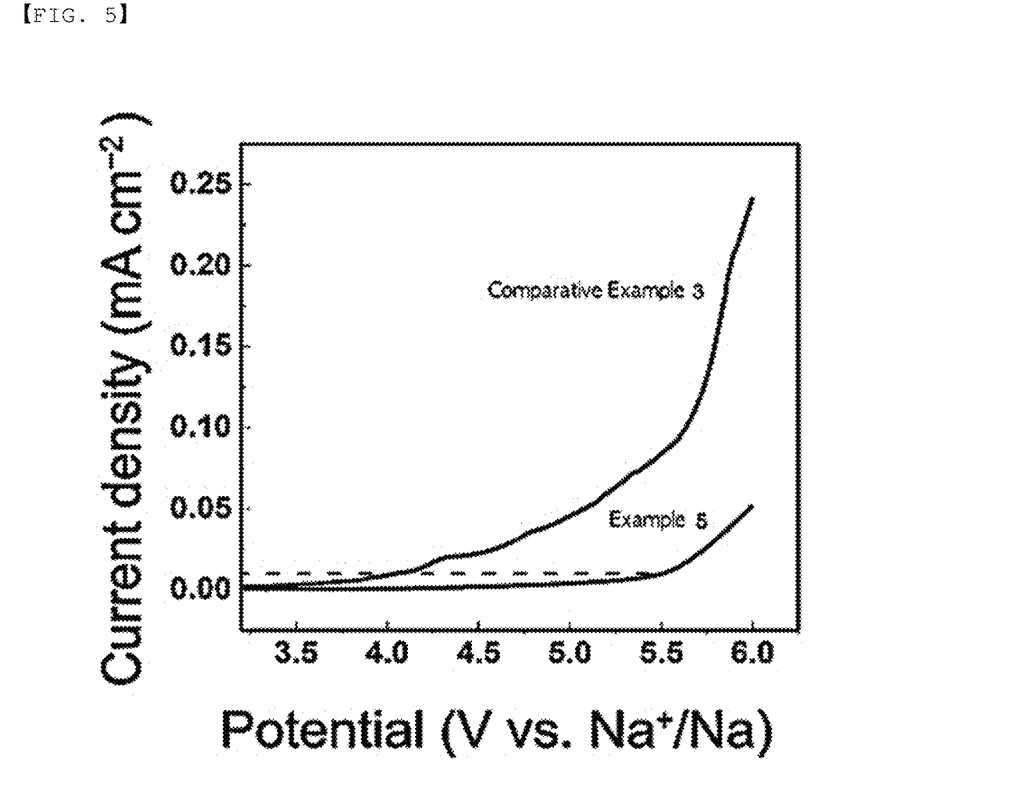
FIG. 5 is a drawing showing results of measuring oxidation stability of electrolytes prepared according to Example 5 and Comparative Example 3 of the present invention.

The oxidation stability of the electrolytes prepared in Example 5 and Comparative Example 3 was measured using a three-electrode electrochemical battery, and the results are shown in FIG. 5. At this time, a platinum disk was used as a working electrode, a platinum plate was used as a counter electrode, and a sodium electrode was used as a reference electrode.

As confirmed in FIG. 5, the oxidation stability of the solid electrolyte according to Example 5 was better than that of Comparative Example 3. This results from the fact that a common carbonate electrolyte is unstable and easily oxidized and decomposed under the high-voltage conditions (4 V or more as compared with $Na^+/Na$) and the fact that sulfone compounds including dimethyl sulfone have high oxidation stability even under higher voltage conditions (5 V or more as compared with $Na^+/Na$).

Evaluation Example 6: Analysis of Sodium/Solid Electrolyte Interfacial Resistance Examples 5 and 7

Figure 6:
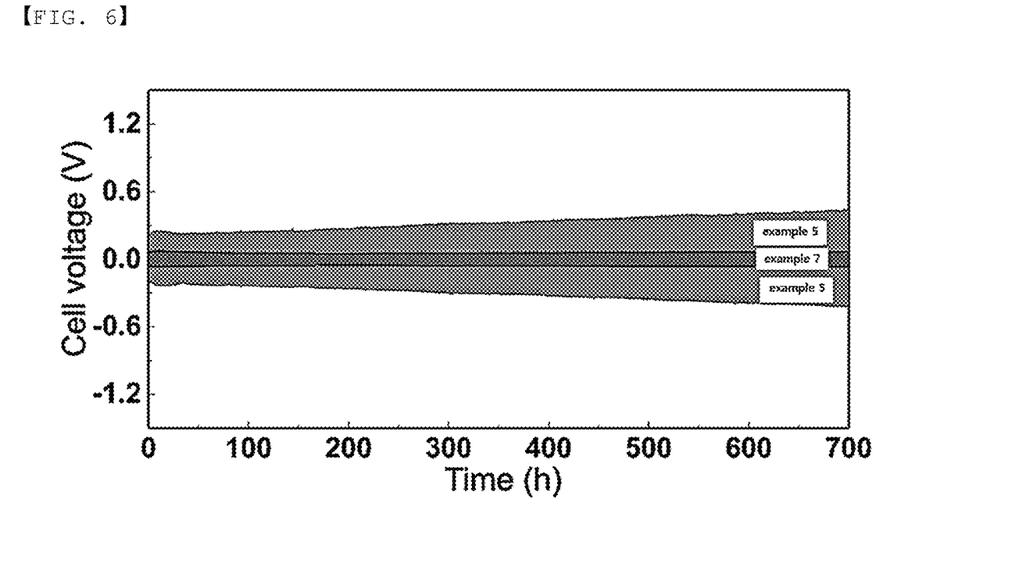
FIG. 6 is a drawing showing results of analyzing sodium/solid electrolyte interfacial resistance for the electrolytes prepared according to Examples 5 and 7 of the present invention.

Interfacial resistance of a sodium/solid electrolyte was analyzed by a charge and discharge process using the solid electrolytes prepared in Examples 5 and 7, and the results are shown in FIG. 6.

Specifically, the coin cell battery manufactured in Manufacturing Example 4 was charged and discharged with a constant current of 0.5 C at 25° C. for 700 hours.

As confirmed in FIG. 6, it is recognized that overvoltage was decreased by the use of the FEC additive. It is recognized therefrom that the resistance of the solid electrolyte and the sodium metal was decreased by the addition of the FEC additive.

Evaluation Example 7: Evaluation of Life Characteristics of Sodium/NVP Battery

Example 7 and Comparative Example 4

Figure 7:
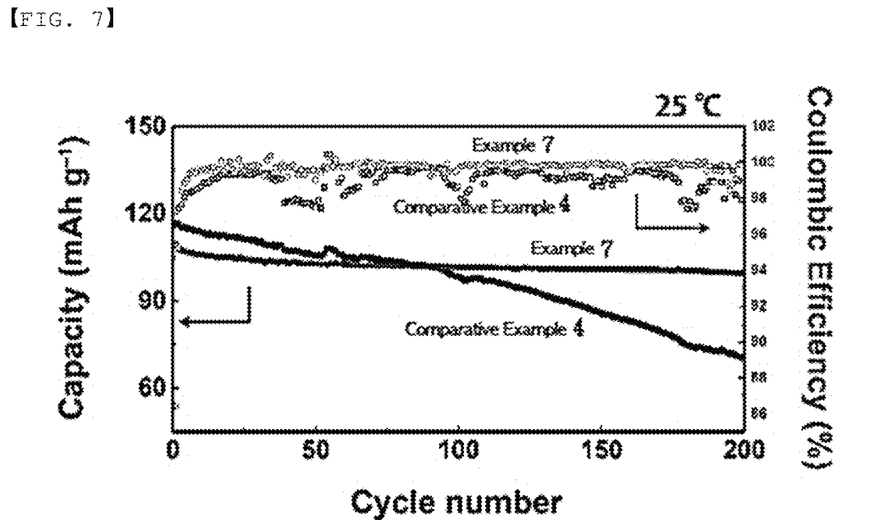
FIGS. 7 and 8 are drawings showing results of evaluating life characteristics of sodium/NCM batteries to which the electrolytes prepared according to Example 1 and Comparative Example 1 of the present invention were applied.
Figure 8:
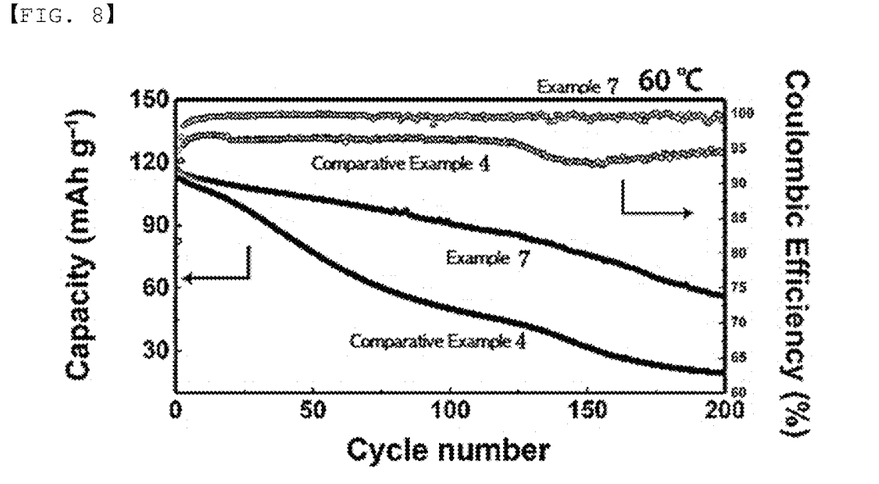

The life characteristics of the sodium/NVP battery to which the electrolytes of Examples 6 and Comparative Example 4 were evaluated, and the results are shown in FIGS. 7 and 8.

Specifically, the sodium/NVP battery manufactured in Manufacturing Example 5 was charged and discharged 200 times with a constant current of 0.2 C in a region of 2.5-4 V at 25° C. and 60° C.

FIG. 7 shows results of charge and discharge under the conditions of 25° C., and FIG. 8 shows results of charge and discharge under the conditions of 60° C.

Referring to FIG. 7, it is confirmed that the sodium/NVP battery including the solid electrolyte according to an exemplary embodiment of the present invention (Example 7) showed a capacity retention rate of 91.1% even after 200 times of charge and discharge under the conditions of 25° C., but in the case of Comparative Example 4, the capacity retention rate was significantly decreased to 60.3%.

Referring to FIG. 8, it is confirmed that the sodium/NVP battery including the solid electrolyte according to an exemplary embodiment of the present invention (Example 7) showed a capacity retention rate of 50.3% after 200 times of charge and discharge under the conditions of 60° C., but in the case of Comparative Example 4, the capacity retention rate was significantly decreased to 17.2%.

Accordingly, though the FEC additive was applied identically, it was confirmed that the life characteristics of the sodium/NVP battery to which the solid electrolyte according to an exemplary embodiment of the present invention was applied were significantly increased as compared with the comparative example.

Evaluation Example 8: Ignition Test of Sulfone Electrolyte for Sodium Battery

Example 5 and Comparative Example 3

Figure 9:
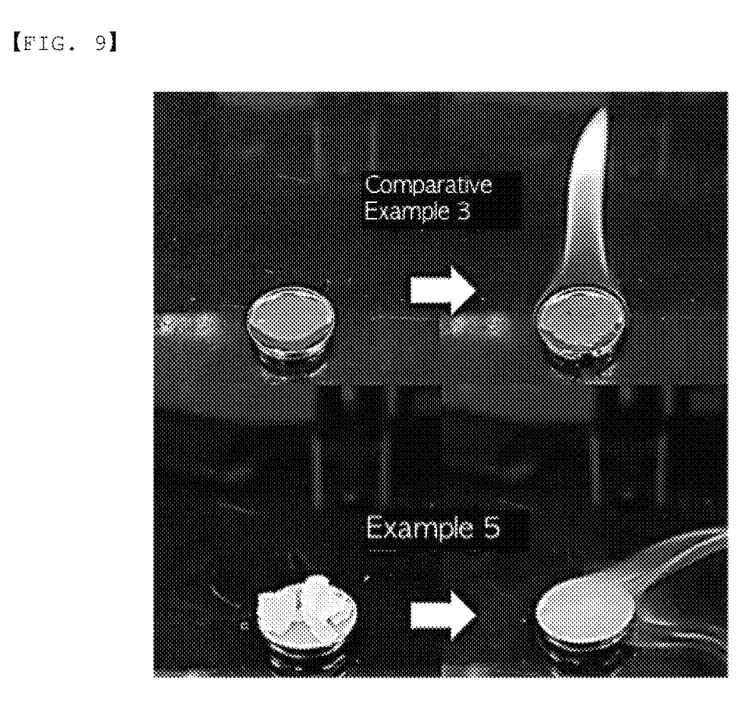
FIG. 9 is a drawing showing results of measuring oxidation stability of electrolytes prepared according to Example 5 and Comparative Example 3 of the present invention.

2 g of the electrolytes prepared in Example 5 and Comparative Example 3 were fractionated and exposed to a gas torch flame, thereby evaluating the ignition stability of the electrolytes, and the results are shown in FIG. 9.

Referring to FIG. 9, the electrolyte according to Comparative Example 3 formed of a carbonate compound was ignited directly after it was exposed to torch flame and burned, but though the solid electrolyte according to Example 5 was directly exposed to torch flame, ignition/combustion did not occur. This is considered to be due to the flame retardant characteristics common to sulfone compounds.

What is claimed is:

1. A solid electrolyte for a secondary battery comprising:
a crystalline organic electrolyte having a cocrystal structure, which is produced from a sulfone solvent represented by the following Chemical Formula 1; and
a bis(fluorosulfonyl)imide alkali metal salt (MFSI):

$R_1R_2SO_2$   [Chemical Formula 1]

wherein $R_1$ and $R_2$ are independently of each other alkyl having 1 to 10 carbon atoms, alkoxy having 1 to 10 carbon atoms, aryl having 6 to 12 carbon atoms, or a combination thereof, and the alkyl, alkoxy, and aryl of $R_1$ and $R_2$ are independently of one another unsubstituted or substituted with halogen, amino, or nitro.

2. The solid electrolyte for the secondary battery of claim 1, wherein
the sulfone solvent is one or more selected from the group consisting of dimethyl sulfone, diethyl sulfone, ethyl methyl sulfone, dipropyl sulfone, dibutyl sulfone, dimethoxy sulfone, ethyl phenyl sulfone, diphenyl sulfone, methyl phenyl sulfone, benzyl sulfone, 4-fluorophenyl methyl sulfone, 4-aminophenyl sulfone, and nitrophenyl sulfone.

3. The solid electrolyte for the secondary battery of claim 1, wherein
the alkali metal (M) is sodium (Na) or lithium (Li).

4. The solid electrolyte for the secondary battery of claim 1, wherein
the sulfone solvent is dimethyl sulfone.

5. The solid electrolyte for the secondary battery of claim 1, wherein
a mole ratio between the bis(fluorosulfonyl)imide alkali metal salt (MFSI) and the sulfone solvent is 1:9 to 4:6.

6. The solid electrolyte for the secondary battery of claim 1, further comprising:
one or more additives selected from the group consisting of vinylene carbonate (VC), fluoroethylene carbonate (FEC), ethylene sulfite (ESA), lithium nitrate (LiNO$_3$), polyethylene oxide (PEO), polyvinylidene fluoride (PVDF), and polyacrylate.

7. The solid electrolyte for the secondary battery of claim 6, wherein the electrolyte includes 0.5 to 5 wt % of the additive.

8. The solid electrolyte for the secondary battery of claim 1, wherein
the electrolyte includes a sulfone-based crystalline organic electrolyte (SCOE).

9. The solid electrolyte for the secondary battery of claim 1, wherein
the electrolyte has a melting point of 50 to 170° C.

10. A secondary battery comprising the solid electrolyte of claim 1 and an electrode.

* * * * *